(12) United States Patent
Barrau et al.

(10) Patent No.: US 6,565,215 B2
(45) Date of Patent: May 20, 2003

(54) IMAGE PROJECTORS

(76) Inventors: Jérôme Barrau, Le Bourg, F-33190 Hure (FR); Jean-Michel Carle, Domaine de la Croix, F-35550 Pipriac (FR); Jean-Jacques Sacre, 8 rue du Champ du Verger, F-35410 Chateaugiron (FR)

( * ) Notice: Subject to any disclaimer, the term of this patent is extended or adjusted under 35 U.S.C. 154(b) by 0 days.

(21) Appl. No.: 09/731,960

(22) Filed: Dec. 7, 2000

(65) Prior Publication Data

US 2002/0051120 A1 May 2, 2002

(Under 37 CFR 1.47)

(30) Foreign Application Priority Data

Dec. 10, 1999 (FR) .............................. 99 15605

(51) Int. Cl.[7] .............................. G03B 21/14
(52) U.S. Cl. .......................... 353/119; 353/61
(58) Field of Search ............. 353/57, 58, 60, 353/61, 55, 56, 119

(56) References Cited

U.S. PATENT DOCUMENTS

| 5,666,171 | A | | 9/1997 | Nakamura et al. | |
|---|---|---|---|---|---|
| 5,683,160 | A | | 11/1997 | Fukaya et al. | |
| 6,007,205 | A | * | 12/1999 | Fujimori | 353/57 |
| 6,033,077 | A | * | 3/2000 | Iwase | 353/119 |
| 6,132,049 | A | * | 10/2000 | Yamaguchi et al. | 353/61 |
| 6,254,238 | B1 | * | 7/2001 | Takamatsu | 353/61 |
| 6,280,038 | B1 | * | 8/2001 | Fuse et al. | 353/57 |
| 6,290,360 | B1 | * | 9/2001 | Konuma et al. | 353/61 |

FOREIGN PATENT DOCUMENTS

| DE | 19631945 | 2/1998 |
|---|---|---|
| EP | 0829750 | 3/1998 |

* cited by examiner

*Primary Examiner*—William Dowling
(74) *Attorney, Agent, or Firm*—Joseph S. Tripoli; Harvey D. Fried; Joseph J. Kolodka

(57) ABSTRACT

The present invention relates to an image projector comprising a casing containing at least:
  an illumination system (11, 10);
  an optical unit comprising at least one optical valve (30', 31', 32', 20) modulating the light emitted by the illumination system;
  a projection lens (5) projecting the modulated light outside the casing;
  a power supply, control electronics and cooling means (116, 117, 118, 119, 140, 141);
  the casing being provided with at least one aperture (106) forming an air inlet. The casing further comprises a specific air filtration means (115) positioned under the optical unit and in such a way as to surround the latter.

The invention is mainly applicable to LCD projectors.

13 Claims, 5 Drawing Sheets

IMAGE PROJECTORS

BACKGROUND OF THE INVENTION

The present invention relates to an image projector, more particularly to an image projector with optical valves such as liquid-crystal valves, which is used to display a computer or video image on an external screen.

One example of an image projector using liquid-crystal optical valves is shown in FIG. 1. This projector comprises an illumination system 1 having a lamp 10, such as a metal halide, xenon or similar lamp, and a reflector 11 surrounding the lamp 10. The illumination system 10 is combined with an optical integrator 2, the role of which is to uniformly distribute the light emitted by the lamp 10 of the illumination system, over the components of the optical unit 3 which will be described hereinafter. The optical unit 3 has, schematically, colour separation means so as to supply each optical valve 30, 31, 32 with the corresponding colour component and a means 20 of recombining the images supplied by the three optical valves. As shown in FIG. 1, the image recombination means is formed by a cube 20 constituting a set of mirrors 22 and 24 occupying the diagonal planes of the cube 20. The three liquid-crystal valves 30, 31, 32 are placed parallel to three faces of the cube. More accurately, the optical valve 30 is parallel to the face 26 of the cube. The optical valve 32 is parallel to the opposite face 28 of the cube, the two valves 30 and 32 being parallel to each other and the optical valve 31 is parallel to the face 27 of the cube and perpendicular to the other two valves 30 and 32.

As the illumination system 1 emits white light, colour separation means are therefore provided in the optical system 3. These means are formed by dichroic mirrors combined with plane mirrors in order to direct, respectively, the blue colour component onto the optical valve 30, the green colour component onto the optical valve 31 and the red colour component onto the optical valve 32. More specifically, the light emitted by the illumination system 1 passes through a first dichroic mirror 33 placed immediately downstream of the integrator 2. The normal N to the plane of the mirror 33 forms an angle of 45° with the optical axis O. Because of this, the dichroic mirror 33 transmits the blue colour component to a plane mirror 34 positioned so as to illuminate the optical valve 30 via a field lens 40 and reflects the remainder of the spectrum towards a second dichroic mirror 35 parallel to the first dichroic mirror 33. This second dichroic mirror 35 reflects the green colour component of the spectrum towards the optical valve 31 through a field lens 41 similar to the lens 40. The dichroic mirror 35 transmits the remainder of the spectrum, i.e. the red colour component. This red component passes through a first lens 42 then is reflected by a plane mirror 36 parallel to the dichroic mirrors 38 and 40. The component reflected by the plane mirror 36 passes through a lens 44 then is reflected again by a plane mirror 37 in such as way as to be sent back to the optical valve 32 through a field lens 43 identical to the lenses 40 and 41. The images formed on the optical valves 30, 31 and 32 are then recombined by reflection and transmission inside the cube 20 so as to obtain a synthetic image on the face 29 of the cube, this image being sent to a projection lens 5.

The apparatus described with reference to FIG. 1 comprises numerous components, especially optical and electronic components, which have to operate in a clean environment and at acceptable temperature levels. Now, in order to obtain good quality images having a high luminosity, it is generally necessary to use powerful projection lamps. The use of bright lamps which are more and more powerful makes the thermal aspects more critical within the projector. This leads to the use of more and more elaborate cooling systems which must also take into account parameters such as the increase in the resolution of the optical valves, the desire to have the minimum overall size, the noise level of ventilation systems and the increase in the functions offered.

SUMMARY OF THE INVENTION

The object of the present invention is therefore to provide an image projector with an improved cooling system which especially enables the following advantages to be obtained, viz.:

to ensure that all the critical parts are kept below their limit temperature;

to allow the proper operation of the projector up to ambient temperatures which may reach 50° C.;

to ensure the system is placed away from dust and to minimize as far as possible the noise level.

As a consequence, the subject of the present invention is an image projector comprising a casing containing at least:

an illumination system;

an optical unit comprising at least one optical valve modulating the light emitted by the illumination system;

a projection lens projecting the modulated light outside the casing;

a power supply, control electronics and cooling means;

the casing being provided with at least one aperture forming an air inlet, characterized in that it further comprises a specific air filtration means positioned under the optical unit and in such a way as to surround the latter.

According to a preferred embodiment, the air filtration means is a component in the shape of a cage, the side walls of which are covered with wire mesh.

Preferably, the present invention is applicable to a colour image projector the optical unit of which comprises three optical valves each provided for one colour, colour separation means to supply each optical valve with the corresponding colour component from the light emitted by the illumination system and a means of recombining images supplied by the three optical valves.

According to another characteristic of the present invention, the projector further comprises at least one cooling means for the optical valve or valves. Preferably, it comprises three turbines positioned inside the specific air filtration means, under each optical valve respectively.

To obtain better cooling of the projector, it further comprises a cooling means for the illumination system formed by a turbine positioned horizontally close to the illumination system, this turbine being extended by two air guides, a first air guide sending part of the air to the illumination system and a second air guide sending the other part of the air to the optical unit.

BRIEF DESCRIPTION OF THE DRAWINGS

Moreover, the projector may comprise additional cooling means and air extraction means generally formed by fans.

According to an additional characteristic of the present invention, the speed of the turbines and of the fans is variable according to the temperature, the temperature being detected by at least one thermistor combined with an electrical control circuit for each fan.

Moreover, according to yet another characteristic of the present invention, the casing has an aperture forming an air inlet on each side face and at least one air extraction aperture on the rear face.

Figure 1:
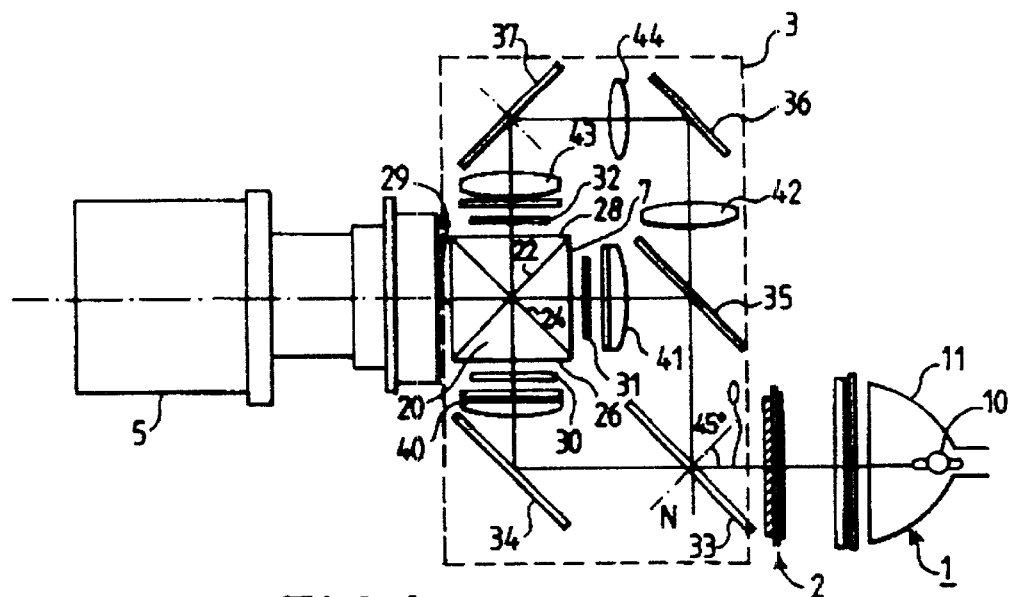

Other characteristics and advantages of the present invention will become apparent on reading the description of a preferred embodiment, this description being given with reference to the appended drawings in which:

FIG. 1, already described, is a schematic representation of the essential components of a projector which may be used with the present invention.

Figure 2:
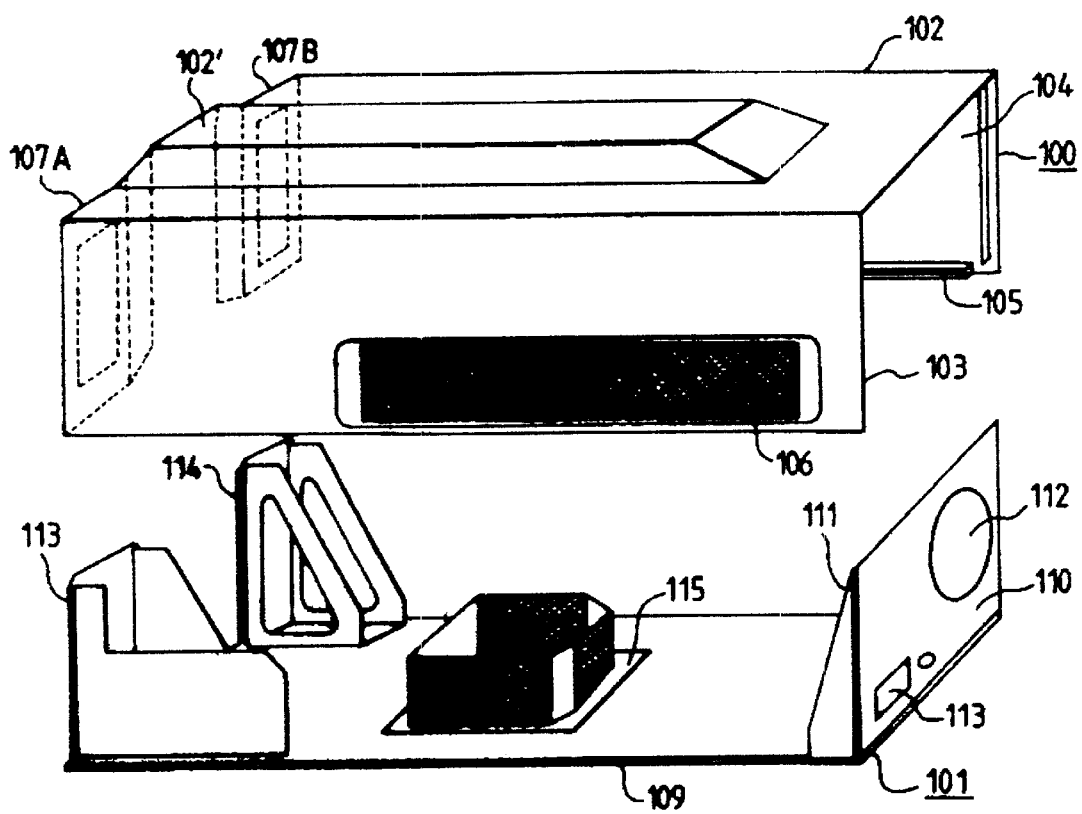

FIG. 2 is an exploded schematic perspective view of a casing according to the present invention used for a projector of the type shown in FIG. 1.

Figure 3A:
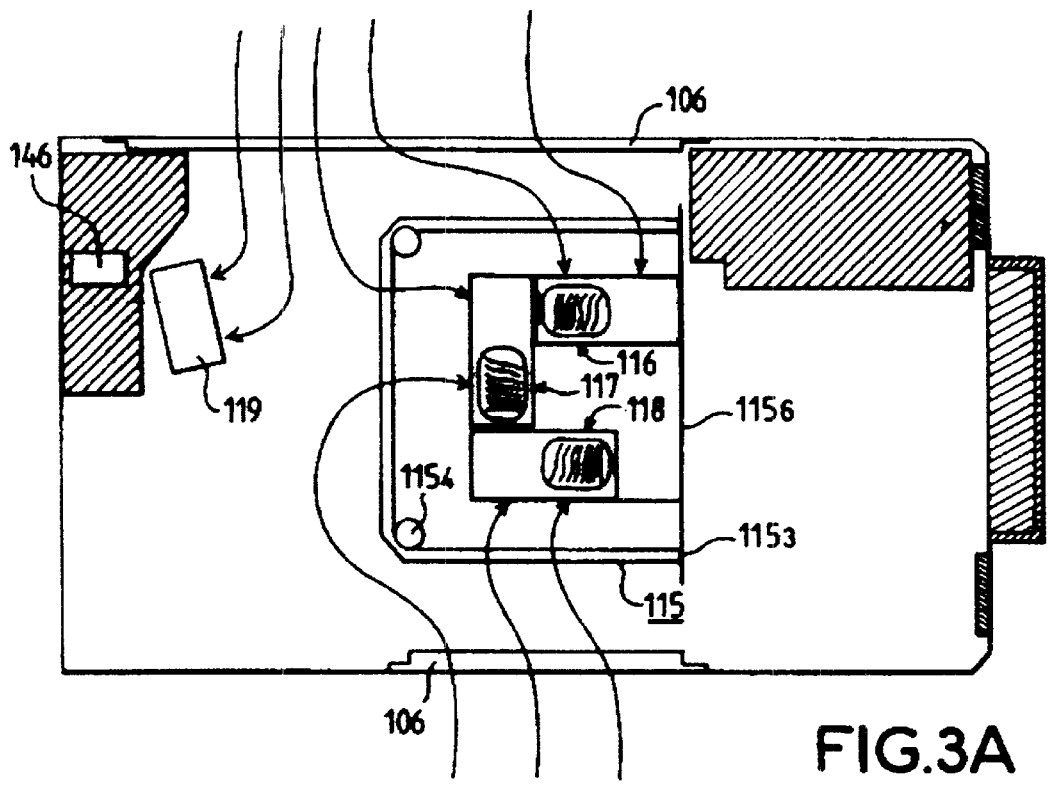
Figure 3B:
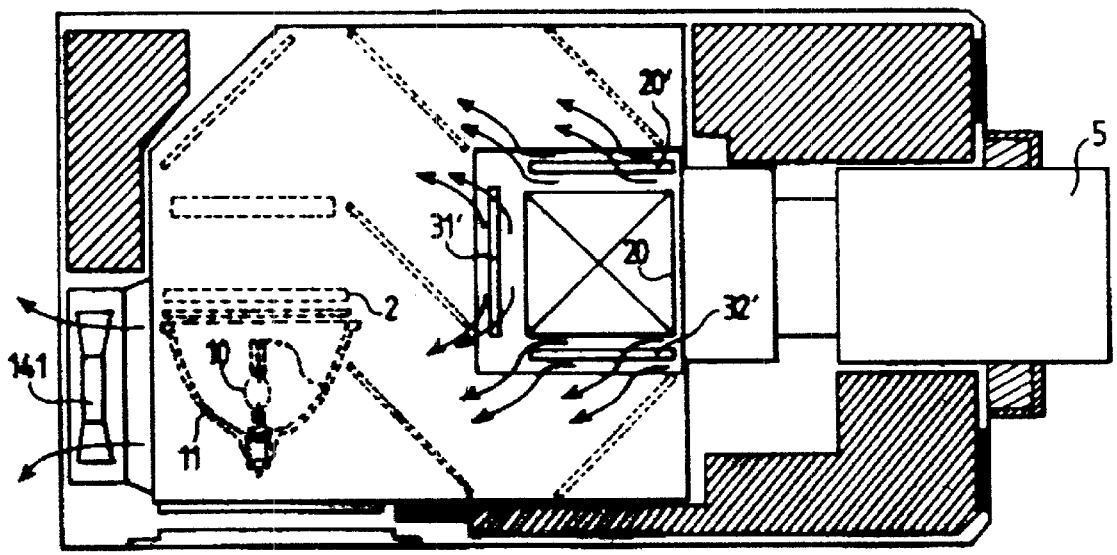

FIGS. 3A and 3B are schematic top views of the upper part and the lower part respectively of the projector, showing the positioning of the specific filtration and cooling means used in the present invention.

Figure 4:
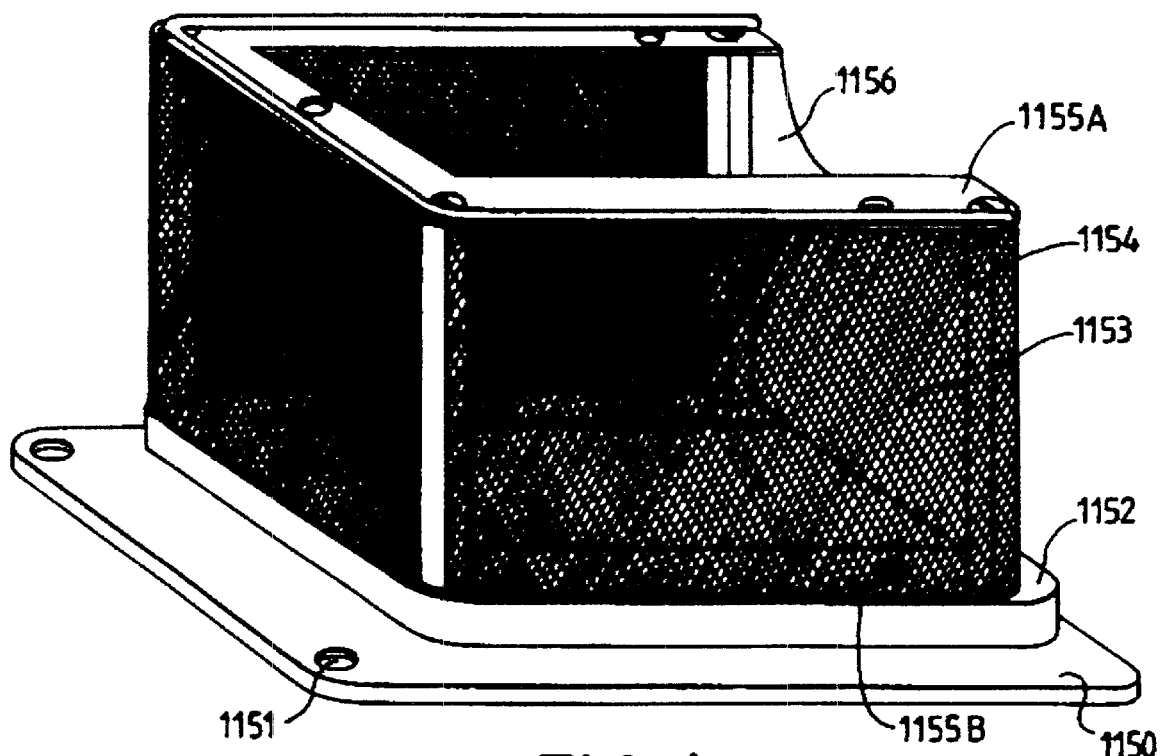

FIG. 4 is a partial perspective view of the specific air filtration means used in the present invention.

Figure 5:
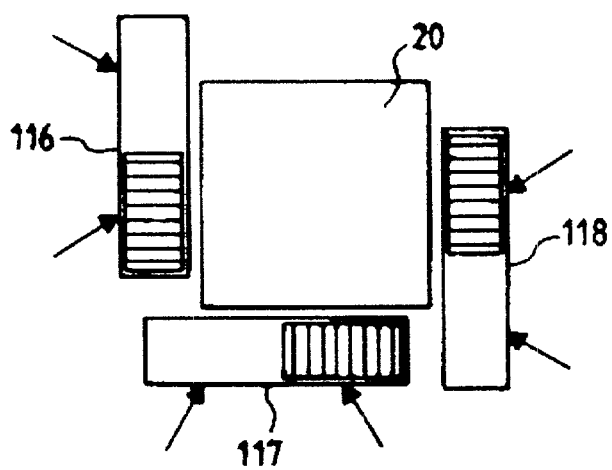

FIG. 5 is a schematic top view showing the position of the three turbines used to cool the optical valves.

Figure 6:
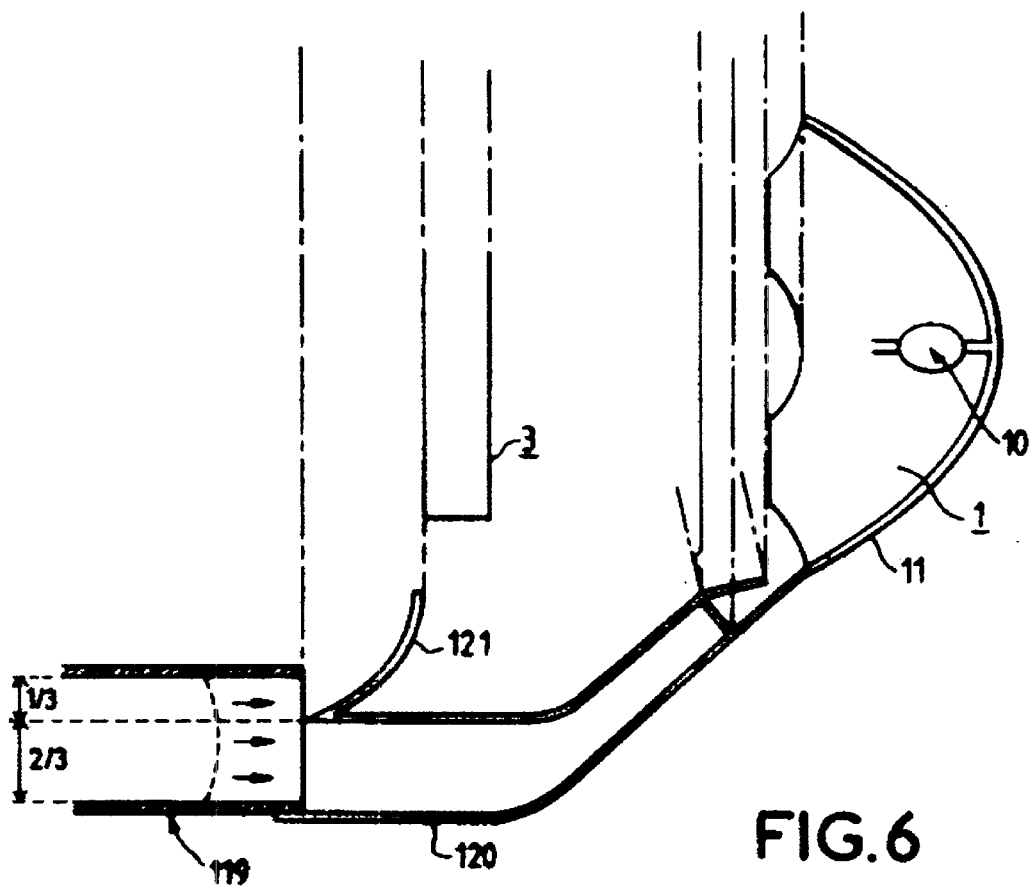

FIG. 6 is a lateral sectional view of the cooling means of the illumination system.

Figure 7:
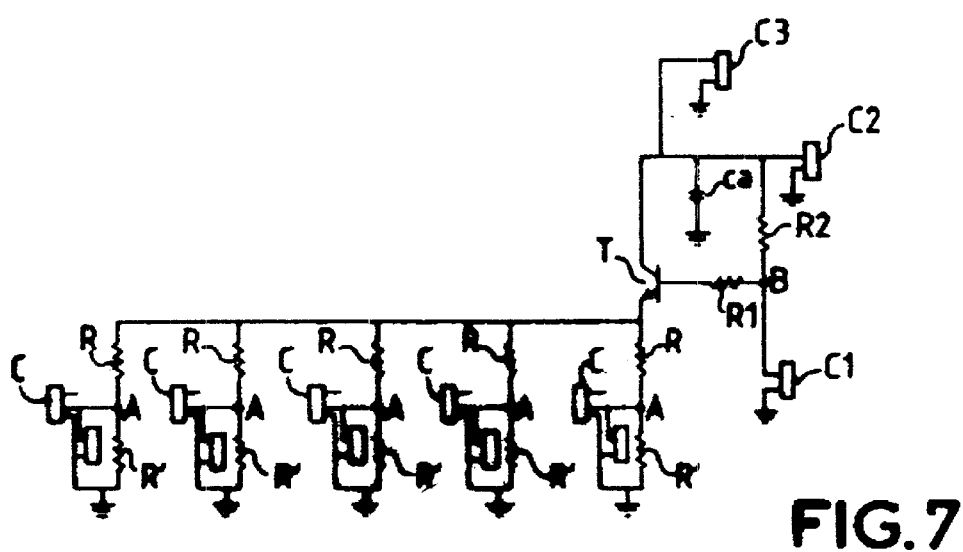
Figure 8:
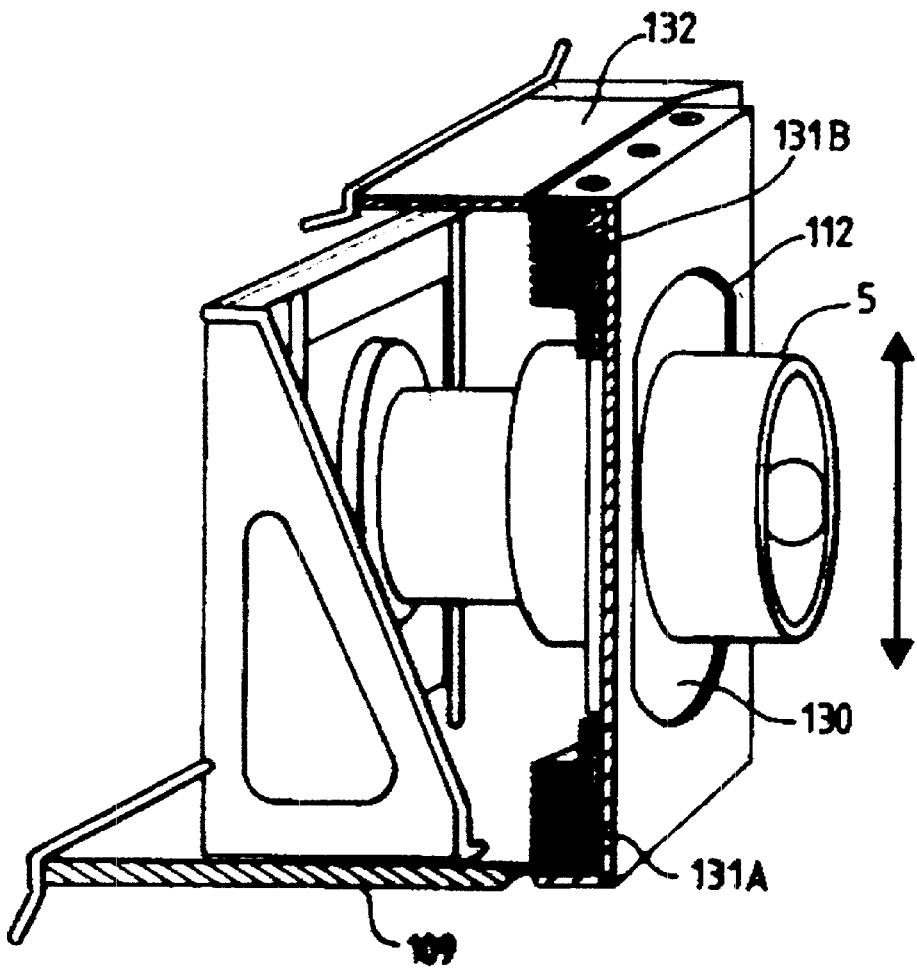

FIG. 7 is a circuit diagram showing the control box for the turbines and fans used in the present invention, and FIG. 8 is a perspective view of part of the front face used in the present invention.

DESCRIPTION OF THE PREFERRED EMBODIMENTS

In order to simplify the description, the same components bear the same reference numbers in the figures.

FIG. 2 shows a perspective view of a casing which may contain the components of the projector of FIG. 1. As this casing has a substantially parallelepipedal shape, it comprises an upper part or lid 100 which has a cross section in the shape of a U. The lid therefore has a top plate 102 and two side panels 103, 104 provided in their lower part with a support rod 105.

As shown in FIG. 2, the side plates 103 and 104 are each provided with an oblong window 106 forming an air inlet. This window 106 is closed by a first filtration means made up of an EMC mesh complying with electromagnetic standards, of a non-inflammable foam and of a metal gauze having 160 $\mu$m apertures, for example. The upper plate 102 has been pressed in its central part to enable the various components to be housed. Moreover, the upper lid 100 has in its rear part two plates 107a and 107b which snap-fasten on the lower frame, as explained below. Between the two plates 107a and 107b an aperture 108 is provided, which enables the air used for the ventilation of the projector components to be extracted. As shown in FIG. 2, the casing therefore comprises a lower part 101 provided with a frame formed by a rectangular plate 109 on which the front face 110 is mounted and fastened onto the frame via brackets 111. The front face 110 has a circular or oblong aperture 112 for the projection lens to pass through, as will be explained below and a control panel 113 provided with buttons (not shown). On the rear part of the frame 109 two housings 113 and 114 in the shape of an angle bracket are also provided, against which the plates 107a and 107b are snap-fastened. Moreover, according to the present invention, the plate 109 is hollowed out in its central part in order to receive a second filtration component which is positioned so as to surround the turbines cooling the optical unit 3, as shown in FIGS. 3A and 3B. This specific filtration means 115 will be described and shown in more detail in FIG. 4. It comprises a base plate 1150 which is fastened via any known means such as screws passing through the holes 1151, to the plate 109 forming the frame. This type of fastening enables the filtration means 115 to be removed by extracting it through the bottom of the casing for the purpose of cleaning it. Another plate 1152, intended to receive the actual filtration components, is mounted on the plate 1150. The filtration component is made, for example, of a metal gauze 1153 having 80 $\mu$m apertures. The gauze rests against four lugs 1154 provided at the four corners of the plate 1152, and which lugs are secured via U-shaped brackets 1155a, 1155b, as shown in FIG. 4. The front face of the filtration means is sealed with an impermeable fabric 1156. The use of this second filtration means positioned under the sensitive components such as the liquid-crystal optical valves means that the region most sensitive to dust can be kept in a very clean environment.

According to another characteristic of the present invention and as shown in FIGS. 3A, 3B and 5, a specific cooling means, viz. one of the turbines 116, 117, 118, is associated with each liquid-crystal valve 30', 31', 32' surrounding the cube 20. As clearly shown in FIG. 5, the turbines are positioned vertically under each liquid-crystal valve so that the air exiting the turbine arrives at the active surface of the liquid-crystal valves, as symbolized by the arrows.

The other essential components of the projector, viz. the illumination system comprising a lamp 10 and a reflector 11, an integrator 2 and a set of dichroic mirrors and of plane mirrors similar to those described with reference to FIG. 1 for sending the blue, green and red colour components to the liquid-crystal valves 30', 31' and 32', respectively, are positioned in the upper part of the casing, as shown in FIG. 3B.

According to another characteristic of the present invention, an additional turbine 119 is provided inside the casing containing the projector components. This turbine 119 is positioned horizontally in the lower part of the casing, as shown in FIG. 3B. As shown in FIG. 6, this turbine 119 opens out into an air guide which is in two parts 120, 121. The first air guide 120 directs the air blown by the turbine 119 onto the illumination system 1, most particularly at the edge of the reflector 11. The air guide 121 directs the air blown by the fan 119 onto the components of the optical unit 3. Preferably, two-thirds of the air blown by the turbine 119 are sent to the illumination system 1, the remaining third being sent to the optical unit 3.

Moreover, as shown schematically in FIGS. 3A and 3B, two axial fans 140 and 141 are provided in the rear part of the casing, one of the fans being used to extract air from the casing, the other being used to cool the ballast of the control circuit. The other hatched parts of FIGS. 3A and 3B show the location of the power supplies and of the signal receiving cards.

According to an additional characteristic of the present invention, and as shown in FIG. 7, the various turbines 116, 117, 118, 119 and fans 140, 141 are controlled so as to have a speed which can be varied according to temperature. As a result, the control circuit for the fans and the turbines is associated with at least one thermistor. As shown in FIG. 7, the circuit comprises a transistor T mounted in the collector-follower configuration. In the embodiment shown, the source of the transistor is connected to 5 resistance bridges mounted in parallel. Each bridge is formed by two resistors R and R' connected in series between the source of the transistor T and earth. A connector C, intended to receive the power intakes for the fans and turbines, is mounted at the common point A between the 2 resistors R and R'. The thermistor is mounted on a connector C1 provided between earth and a point B. The point B is connected through a resistor R1 to the emitter of the transistor T and through a resistor R2 to the power-supply connector C2 which is also connected to the collector of the transistor T. A capacitor Ca is mounted in parallel between the power supply and earth. This circuit enables the various fans and turbines to be supplied with power. The resistors R and R' do not necessarily have the same values from one bridge to the other and have values which can be varied according to the power demanded by the fans and turbines. An additional connector C3 for the lamp ballast is mounted between earth and the power supply C2.

Moreover, as shown in FIG. 8, the projection lens 5 is generally mounted so that it can be offset upwards or downwards in order to offset the projected image. Because of this, the lens passes through an oblong aperture 112 made in the front face of the casing. However, in order to avoid dust getting in, the projection lens 5 may be mounted on a system such as shown in FIG. 8, viz. the projection lens is sealed onto a plate 130, which in turn is fastened via a bellows system 131a, 131b to the frame 109 and to an upper plate 132, respectively, which snap-fastens under the upper part 102 of the lid 100. This bellows system 131a, 131b therefore means that the projection lens 5 can be moved while remaining sealed.

It is obvious to those skilled in the art that the system described above can be modified in numerous ways without departing from the claims below, especially with regard to the positioning of the turbines and of the fans, the materials used, the location of the apertures forming air inlets or for air extraction, etc.

What is claimed:

1. Image projector having a casing comprising:
    an illumination system;
    an optical unit comprising at least one optical valve modulating the light emitted by the illumination system;
    a projection lens projecting the modulated light outside the casing;
    a power supply, control electronics and cooling means; and
    air filtration means comprising a base positioned under the optical unit and sidewalls positioned in such a way as to surround the optical unit;
    the casing being provided with at least one aperture forming an air inlet.

2. Projector according to claim 1, characterized in that the air filtration means is a component in the shape of a cage, the side walls of which are covered with wire mesh.

3. Projector according to claim 1, characterized in that the optical unit comprises three optical valves each provided for one colour, colour separation means to supply each optical valve with the corresponding colour component from the light emitted by the illumination system and a means of recombining images supplied by the three optical valves.

4. Projector according to claim 1, characterized in that it further comprises at least one cooling means for the optical valve or valves.

5. Projector according to claim 4, characterized in that the cooling means is formed by turbines positioned inside the specific air filtration means, under each optical valve respectively.

6. Projector according to claim 1, characterized in that it further comprises a cooling means for the illumination system.

7. Projector according to claim 6, characterized in that the cooling means for the illumination system is formed by a turbine positioned horizontally close to the illumination system.

8. Projector according to claim 7, characterized in that the turbine is extended by two air guides, a first guide sending part of the air to the illumination system and a second guide sending the other part of the air to the optical unit.

9. Projector according to claim 1, characterized in that it further comprises an additional cooling means and an air extraction means formed by fans positioned in the rear part of the casing.

10. Projector according to claim 5, characterized in that the speed of the turbines and of the fans is variable according to the temperature.

11. Projector according to claim 7, characterized in that the speed of the turbines and of the fans is variable according to the temperature.

12. Projector according to claim 9, characterized in that the speed of the turbines and of the fans is variable according to the temperature.

13. Projector according to claim 1, characterized in that the casing has an aperture forming an air inlet on each side face and at least one air-extraction aperture on the rear face.

* * * * *